United States Patent Office 3,262,760
Patented July 26, 1966

3,262,760
METHOD OF PREPARING HIGH-DENSITY COMPACTIBLE URANIUM DIOXIDE PARTICLES
Leon E. Morse, Oak Ridge, Kenneth H. McCorkle, Powell, and Charles E. Schilling, Knoxville, Tenn., assignors to the United States of America as represented by the United States Atomic Energy Commission
No Drawing. Filed Dec. 24, 1963, Ser. No. 333,232
4 Claims. (Cl. 23—355)

Our invention relates to nuclear reactor fuel materials and more particularly to a method of preparing high-density uranium dioxide particles suitable for fabrication by vibratory compaction.

Uranium dioxide is useful as fuel material for various types of nuclear reactors. In previous fuel element designs $UO_2$ has normally been employed in the form of sintered pellets encased in a protective metallic cladding. Fabrication of this type fuel element has been effected by preparing the $UO_2$ in sinterable powder form, granulating and compressing the $UO_2$ to produce pellets, sintering the pellets at high temperature and machining or grinding the sintered pellet surfaces. Both labor and equipment costs are high in this processing sequence. In addition, some of the fabrication steps are not amenable to remote operation behind heavy shielding, which would be required for reprocessed fuel material because of the build-up of radioactive uranium daughter isotopes.

An alternative method capable of substantially reduced processing costs is fabrication by vibratory compaction. In this method $UO_2$ fuel elements are fabricated merely by combining $UO_2$ particles falling within specified size fractions in the fuel container, normally an elongated metallic cylinder, and vibrating the container. Equipment and labor requirements are minimized and remote operation is facilitated. The density obtained (about 90 percent of theoretical) is less than for sintered pellet-type elements, but a substantial overall economic saving is realized owing to lower fabrication costs. A particle size distribution including two or three specified size fractions is normally employed in vibratory compaction of $UO_2$. A preferred particle size distribution is as follows: 55 to 65 weight percent coarse (−10, +16 mesh, U.S. Sieve Series), 10 to 35 weight percent medium (−70, +100 mesh) and 15 to 30 weight percent fine (−200 mesh). The chief problem in this method is preparation of the high-density $UO_2$ particles, and particularly the coarse or millimeter-size fraction. Adequate densification of $UO_2$ particles prepared by previous methods has required high-temperature processes such as arc fusion, and such processes are difficult to contain and operate remotely.

Thorium oxide particles suitable for vibratory compaction have been prepared by a so-called "sol-gel" process wherein a thorium oxide sol containing a critical proportion of nitrate ion is formed, the sol is evaporated at low temperature to produce gel fragments and the gel fragments are calcined. The product particles exhibit a high density (about 99 percent of theoretical) a glassy character and a particle size of mostly over one millimeter in diameter. This method is advantageous in its ease of control, amenability to remote operation and relatively low firing temperature required. Mixed thorium-uranium oxides have also been prepared by incorporating up to 10 atom percent hexavalent uranium in the thorium oxide sol. This method, however, has not been successful for oxides containing higher proportions of uranium because of the difficulty of maintaining a stable sol and because of segregation of the uranium from the thorium. Attempts have been made to apply this method to uranium oxide by forming a tetravalent uranium oxide sol from calcined uranous oxalate, evaporating the sol and firing the resulting fragments, all under a non-oxidizing atmosphere. The requisite product density has not been obtained, however, probably because of residual carbon from the oxalate decomposition and because of high-temperature evolution during firing of chlorides employed in forming the sol.

It is therefore an object of our invention to provide a method of preparing $UO_2$ particles suitable for fabrication into fuel elements by vibratory compaction.

Another object is to provide a method of preparing high-density, millimeter size $UO_2$ particles.

Another object is to provide a method of preparing said particles which is amenable to remote operation.

Other objects and advantages of our invention will be apparent from the following detailed description and claims.

In accordance with our invention, high-density $UO_2$ particles are prepared by precipitating colloidal hydrous uranium (IV) oxide from tetravalent uranium solution under a non-oxidizing atmosphere, separating the precipitated oxide from the remaining solution while maintaining the uranium in the tetravalent state, heating the precipitate to dryness under a non-oxidizing atmosphere at a temperature below 130° C., the temperature being maintained below 100° C. until the precipitate has passed through a pasty stage, and firing the resulting fragments at a temperature of at least 1050° C. under a non-oxidizing atmosphere. The resulting particles resemble thorium oxide sol-gel particles in their high-density, glassy character and size. This process is amenable to remote operation, and high-density particles are obtained at a relatively low temperature. After a simple sizing step, these particles may be fabricated into fuel elements by vibratory compaction.

Colloidal hydrous uranium (IV) oxide is precipitated by addition of an alkaline reagent to an aqueous solution containing tetravalent uranium. The tetravalent uranium may be supplied in the form of an organic salt such as uranous formate or by reduction of hexavalent uranium in solution. Since the most common source of uranium is uranyl nitrate solution obtained in solvent extraction purification, it is preferred to prepare the tetravalent uranium by reduction of a uranyl nitrate solution. Reduction may be effected by adjusting the nitrate content to the desired level, providing a platinum catalyst and a nitrite-inhibiting agent in the solution and introducing gaseous hydrogen. The concentration of uranium in the uranyl nitrate solution is not critical, but about 0.5 molar U(VI) is preferred. The nitrate content is adjusted to satisfy the stoichiometric requirement for formation of uranous nitrate, that is, a $NO_3^-$ to $U^{+6}$ ratio of 4 to 1, with a slight excess being preferred to prevent precipitation during reduction. Nitrate may be conveniently supplied by addition of nitric acid. A small amount, e.g., 0.001 molar, of platinum as chloroplatinic acid is provided as a catalyst. In order to prevent reoxidation of the uranium by the nitrite normally present with nitrate, a nitrite inhibitor is also provided in the solution. Urea, preferably at a proportion of 0.25 to 0.3 molar, is suitable for this purpose. An alkaline reagent is introduced into the resulting tetravalent uranium solution, preferably at a proportion sufficient to bring the pH to a value of 5 to 6, to precipitate the hydrous uranium (IV) oxide. Although any alkaline reagent may be employed, ammonium hydroxide and hydrazine are preferred because of their ease of removal in subsequent washing and firing steps. Exclusion of oxygen is critical to avoiding the formation of hexavalent uranium during precipitation, and an atmosphere of an inert gas such as helium may be provided for this purpose.

The precipitate is in the form of a gelatinous material consisting of colloidal particles. In order to remove ionic constituents the precipitate is thoroughly washed with water. Residual ionic materials would otherwise result in undesirable agglomeration during drying. Oxygen is also excluded in this step, and the use of an inert atmosphere is preferred. The precipitate may be separated by centrifugation and decantation or by filtration. Filtration is enhanced by maintaining the pH of the precipitate slurry at a value of 5 to 6.

It is also possible to form a stable sol by close adjustment of ionic content in water containing the precipitated oxide. The exact conditions required for a stable sol have not been established, however, and formation of a sol is not critical to obtaining oxide fragments with the desired properties. In the event that a stable sol is formed during washing, the sol is evaporated in the same manner as the gelatinous precipitate. A tetravalent uranium oxide sol formed from other than precipitated material could also be evaporated in this manner to produce gel fragments, but no reproducible method of forming such a sol without the use of undesirable peptizing agents such as chlorides has been developed.

The washed colloidal precipitate is then dried under controlled conditions to produce gel fragments. The drying temperature is maintained below 100° C., and preferably at about 75° C. to 90° C. until the oxide has passed through a pasty stage and discrete fragments have been formed. The temperature may then be increased to about 125° C. to 130° C. until the bulk of the residual volatile material is removed. Exclusive of oxygen is also critical in this step, and an inert atmosphere is preferred.

The resulting oxide fragments are then densified by firing at an elevated temperature. A temperature of at least 1050° C. is required, and about 1050° C. to 1150° C. is preferred. No additional densification is obtained at higher temperatures, and operational problems would be increased. In a preferred procedure the temperature is first increased slowly, that is, at a rate not exceeding about 100° C. to 300° C. per hour to a temperature of about 500° C. and then increased to the maximum given above. Oxygen is again excluded and an inert or reducing atmosphere is employed. It is preferred to use an inert gas such as argon containing hydrogen at a non-explosive concentration, e.g., 4 percent.

The resulting particles exhibit a glassy appearance and strength characteristic of compactible oxides and a density of about 97 to 98.5 percent of theoretical. The particle size is mostly over one millimeter, which size may be employed as the coarse fraction in vibratory compaction. The medium and fine fractions may be obtained by comminution, e.g., by conventional ball-milling, of the millimeter-size particles.

It is noted that substantial exclusion of oxygen is important in each of the steps described above. Hexavalent uranium disrupts the densification of particles during firing, and a dull, granular texture rather than a glassy character is produced. In addition to lowered density, the particles tend to erode and flake off during compaction. The extent to which hexavalent uranium renders the product unsuitable depends on the particular step where oxidation occurs. For example, oxidation of the finely divided precipitate is most harmful, and about 2 to 3 percent oxidation is the maximum permissible at this stage, but larger amounts of hexavalent uranium, that is up to about 10 mole percent, are permissible where oxidation takes place in the tetravalent uranium solution. In order to minimize oxidation it is preferred to use dry-box facilities for each of the process steps.

Our invention is further illustrated by the following specific examples.

*Example I*

Dense $UO_2$ particles were prepared from uranous formate by means of the following procedure. Fifteen milliliters of uranous formate solution was placed in each of eight 35 ml. tubes. Four of the samples were precipitated with ammonium hydroxide and four with hydrazine hydrate. In each case a green-black gelatinous precipitate was formed. The precipitates were separated by centrifugation and were washed by reslurrying in deoxygenated water and centrifugation. The precipitates were then dried under a slight vacuum with a low flow of purified argon over a period of 3 days, the temperature being gradually increased from 27° C. to 120° C. An air leak at the door of the dryer caused some samples to become oxidized. The unoxidized samples were fired in hydrogen up to 450° C. at a temperature increase rate of 100° C. per hour and then in hydrogen at 1045° C. for 4 hours. The toluene displacement density of the unoxidized particles was 10.68 grams per cubic centimeter, or 97.4 percent of theoretical. The particle size was mostly one to two millimeters in diameter, and the particles exhibited a vitreous appearance characteristic of compactible oxides.

*Example II*

$UO_2$ particles were prepared from uranyl nitrate by means of the following procedure. A 0.5 molar U(VI)-2.0 molar $HNO_3$-0.033 molar urea solution was reduced by bubbling hydrogen gas through the solution in the presence of a 0.004 molar platinum catalyst to produce a uranous nitrate, $U(NO_3)_4$, solution. Hydrous uranous oxide was precipitated by addition of an equal volume of 3.0 molar ammonium hydroxide solution in an instantaneous mixing device. The precipitate was collected and washed with boiled water by centrifugation and decantation. The washed precipitate was then dried overnight in a helium stream at 80° C. to produce oxide fragments. The fragments were then heated at a rate of 200° C. per hour to 400° C. in argon containing 4 volume percent hydrogen and then to 1100° C. in hydrogen and held for 5 hours. The fired product consisted of shiny black fragments mostly over 1 millimeter in diameter. The density of the fragments, as determined by toluene displacement, was 97.6 percent of theoretical.

*Example III*

A uranous nitrate was prepared by reducing a 0.5 molar uranyl nitrate-2 molar nitric acid-0.083 molar urea solution containing a platinum catalyst with hydrogen, the urea being provided in the solution to inhibit reoxidation of the uranium. The solution was filtered to remove suspended platinum, and hydrous uranous oxide was precipitated by mixing equal volumes of the solution with a 6 molar ammonium hydroxide solution in an instantaneous mixing device. The solids were separated by centrifugation, and were washed twice by slurrying in boiled water and centrifugation. The solids were then dried overnight at a maximum temperature of 120° C. in high purity argon. The resulting fragments were heated at 200° C. per hour to 700° C. in argon containing 4 volume percent hydrogen and at 1100° C. in hydrogen for 5 hours. Analysis of the product fragments indicated an empirical formula of $UO_{2.003}$, a surface area of 0.005 square meters per gram, a particle size 95 percent greater than 20 mesh (840 microns) and a density of 97.3 percent of theoretical. Electron micrographs of the fragments revealed no internal porosity.

It may be seen from the above examples that high-density particles with characteristics suitable for vibratory compaction may be prepared by the method of our invention.

The above examples are merely illustrative and are not to be construed as limiting the scope of our invention, which is limited only as indicated by the appended claims.

Having thus described our invention, we claim:

1. The method of preparing high-density millimeter-size $UO_2$ particles which comprises precipitating colloidal hydrous uranous oxide in aqueous solution under a non-oxidizing atmosphere, separating the resulting precipitate from the remaining solution, washing said precipitate under a non-oxidizing atmosphere, heating said precipitate to dryness under a non-oxidizing atmosphere at a temperature below about 130° C., said temperature being maintained below 100° C. until said precipitate has passed through a pasty stage, and firing the resulting fragments at a temperature of at least 1050° C. in a non-oxidizing atmosphere.

2. The method of preparing high-density millimeter-size $UO_2$ particles which comprises adding an alkaline reagent to an aqueous solution containing tetravalent uranium ions under a non-oxidizing atmosphere whereby hydrous uranous oxide is precipitated, separating the resulting precipitate from the remaining solution, washing said precipitate under a non-oxidizing atmosphere, heating said precipitate to dryness under a non-oxidizing atmosphere at a temperature below about 130° C., said temperature being maintained below 100° C. until said precipitate has passed through a pasty stage, and firing the resulting fragments at a temperature of at least 1050° C. in a non-oxidizing atmosphere.

3. The method of claim 2 wherein said tetravalent uranium ions are supplied by reduction of hexavalent uranium ions in an aqueous solution containing nitrate ions.

4. The method of claim 2 wherein said alkaline reagent is selected from the group consisting of ammonium hydroxide and hydrazine.

References Cited by the Examiner
UNITED STATES PATENTS 3,035,895   5/1962   McCorkle et al. _____ 23—14.5

BENJAMIN R. PADGETT, *Primary Examiner.*

S. TRAUB, *Assistant Examiner.*